(12) United States Patent
Kleinguetl et al.

(10) Patent No.: US 10,653,978 B2
(45) Date of Patent: May 19, 2020

(54) FILTERING SKIMMERS AND BEACHES FOR USE IN WATER SEPARATION AND TREATMENT

(71) Applicant: Halliburton Energy Services, Inc., Houston, TX (US)

(72) Inventors: Kevin G. Kleinguetl, Kingwood, TX (US); Brice Aaron Jackson, Houston, TX (US); Lawrence Joseph Herskowitz, Pearland, TX (US); Adam Dotson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 36 days.

(21) Appl. No.: 16/099,078

(22) PCT Filed: Dec. 18, 2017

(86) PCT No.: PCT/US2017/066927
§ 371 (c)(1),
(2) Date: Nov. 5, 2018

(87) PCT Pub. No.: WO2019/125351
PCT Pub. Date: Jun. 27, 2019

(65) Prior Publication Data
US 2020/0038783 A1   Feb. 6, 2020

(51) Int. Cl.
*B01D 21/24* (2006.01)
*B01D 17/032* (2006.01)
(Continued)

(52) U.S. Cl.
CPC ..... *B01D 21/2438* (2013.01); *B01D 17/0214* (2013.01); *B01D 17/045* (2013.01);
(Continued)

(58) Field of Classification Search
CPC ............ B01D 17/0214; B01D 21/0012; B01D 21/2438; C02F 1/40; E21B 21/063; E21B 43/34
(Continued)

(56) References Cited

U.S. PATENT DOCUMENTS 3,954,619 A * 5/1976 Fry .................... B01D 21/2494
210/525
4,551,246 A * 11/1985 Coffing ................... C02F 1/465
210/540

(Continued)

FOREIGN PATENT DOCUMENTS

| CN | 101496963 A | 8/2009 |
| CN | 103508525 A | 1/2014 |

(Continued)

OTHER PUBLICATIONS

International Search Report and Written Opinion issued in related PCT Application No. PCT/US2017/066927 dated Sep. 19, 2018, 10 pages.

(Continued)

*Primary Examiner* — Christopher Upton
(74) *Attorney, Agent, or Firm* — Tenley Krueger; Baker Botts L.L.P.

(57) ABSTRACT

Wastewater or effluent treatment systems and methods that employ filtering skimmers and/or beaches for separating water from solids and/or other wastes are provided. In some embodiments, the systems include: at least one tank defined by a bottom wall and at least one side wall; a beach including a ramped surface disposed near a side wall of the tank, the ramped surface having a base end disposed at a first elevation relative to the bottom wall of the tank, and a top end opposite the base end at a second elevation relative to the bottom wall of the tank, the second elevation being greater than the first elevation; and a skimmer disposed in the tank (Continued)

that is configured to move material at a surface of the tank toward the beach, wherein (a) at least a portion of the skimmer, (b) at least a portion of the ramped surface of the beach, or (c) at least portions of both the skimmer and the ramped surface of the beach includes a filter material.

18 Claims, 2 Drawing Sheets

(51) Int. Cl.
    *B01D 17/02*      (2006.01)
    *B01D 17/04*      (2006.01)
    *B01D 21/00*      (2006.01)
    *C02F 1/00*      (2006.01)
    *C02F 1/40*      (2006.01)
    *E21B 21/06*      (2006.01)
    *E21B 43/34*      (2006.01)
    *C02F 101/32*      (2006.01)
    *C02F 103/10*      (2006.01)

(52) U.S. Cl.
    CPC .......... *B01D 21/0012* (2013.01); *C02F 1/004* (2013.01); *C02F 1/40* (2013.01); *E21B 21/063* (2013.01); *E21B 43/34* (2013.01); *C02F 2101/32* (2013.01); *C02F 2103/10* (2013.01)

(58) Field of Classification Search
    USPC .............. 210/776, 525, 540; 166/75.12, 267
    See application file for complete search history.

(56) References Cited

U.S. PATENT DOCUMENTS

| | | | | |
|---|---|---|---|---|
| 4,713,181 A | * | 12/1987 | Russell | B01D 21/0012 210/776 |
| 4,913,805 A | * | 4/1990 | Chin | B03D 1/1462 210/776 |
| 5,015,393 A | * | 5/1991 | Russell | B01D 17/0214 210/776 |
| 5,022,992 A | * | 6/1991 | Looker | B01D 17/0214 210/540 |
| 6,190,570 B1 | * | 2/2001 | Nakamura | E02B 15/104 210/776 |
| 2014/0360880 A1 | | 12/2014 | Mahmoudi et al. | |

FOREIGN PATENT DOCUMENTS

| | | |
|---|---|---|
| WO | 2007/059606 A1 | 5/2007 |
| WO | 2015/135764 A1 | 9/2015 |

OTHER PUBLICATIONS

"BaraH2O(TM) Slop Treatment Unit: Offshore Separation Technology", Halliburton Document H012454, found at https://www.halliburton.com/content/dam/ps/public/bar/contents/Data_Sheets/web/Sales_Data_Sheets/BaraH2O-Slop-Treatment-Unit.pdf, Jan. 2017, 2 pages.

"BaraH2O(TM) Slop Treatment Unit Delivers Cost Reduction and Operational Efficiencies: Case Study", Halliburton Document H012791, found at https://www.halliburton.com/content/dam/ps/public/bar/contents/Case_Histories/web/H012791.pdf, Jan. 2018, 2 pages.

BaraH2O(TM) Slop Treatment Unit Delivers Cost Reduction and Safer Operations in UK North Sea: Case Study, Halliburton Document H012555, found at https://www.halliburton.com/content/dam/ps/public/bar/contents/Case_Histories/web/BaraH2O-SlopUnitTreatment.pdf, Apr. 2017, 2 pages.

"Halliburton Baroid: Separation Solutions—Engineered Solutions to Maximize Fluid Performance", Halliburton Brochure H012943, found at https://www.halliburton.com/content/dam/ps/public/bar/contents/Brochures/Web/baroid-separation-solutions.pdf, May 2018, 13 pages.

* cited by examiner

FILTERING SKIMMERS AND BEACHES FOR USE IN WATER SEPARATION AND TREATMENT

CROSS-REFERENCE TO RELATED APPLICATION

The present application is a U.S. National Stage Application of International Application No. PCT/US2017/066927 filed Dec. 18, 2017, which is incorporated herein by reference in its entirety for all purposes.

BACKGROUND

The present disclosure relates to systems and methods for treating wastewater and effluent such as water that has been used in conjunction with subterranean operations.

Various types of subterranean well bore operations (e.g., fracturing, drilling, etc.) sometimes generate large volumes of wastewater or effluent, such as produced water, surface water, flowback water, and the like. Typically, this wastewater or effluent is collected into various ponds, sumps, or tanks at a job site and eventually transferred to a main holding area or sump. From here, the water may be transferred to a water treatment plant for processing before discharge to the environment. Wastewater and effluent may contain a variety of components. The wastewater or effluent often includes a dilute slurry of finely divided particulates or other undissolved solids, either indigenous to the subterranean formation or mine site or a by-product of a mining or well treatment operation. Wastewater or effluent also may be produced by other processes and/or equipment at a job site, including but not limited to rainwater and deck drainage, as well as water used as a coolant, washdown or cleaning fluid, storm water, and/or other surface operations.

Moreover, certain drilling fluids may include invert emulsion fluids, i.e., emulsions in which the non-oleaginous fluid is the discontinuous phase and the oleaginous fluid is the continuous phase. During the drilling process, it is not uncommon for such invert emulsion drilling fluids to encounter a water bearing formation, which may alter the ratio of oleaginous fluid to non-oleaginous fluid. In some cases, emulsions that are difficult to break may form in the fluid. The recovered drilling fluid also may include other waste materials such as oils and/or particulate materials suspended therein. Many offshore rigs drilling with oil-based drilling fluids may produce significant amounts of wastewater or effluent that includes oil, dissolved and undissolved salts, coarse and fine undissolved solids in this way. Conventional emulsion breaker additives sometimes may be used to treat such fluids and restore the desired ratios. The wastewater or effluent usually may not be directly discharged into the sea because of its hydrocarbon content, which is usually higher than regulatory limits. Therefore, wastewater or effluent is often transported in boat tanks to shore for disposal according to the local regulations, or treated to remove contaminants before the remaining clean water is either discharged or reused. The transportation of contaminants and/or untreated wastewater or effluent can be costly and/or increase the operational complexity of offshore drilling operations.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates to systems and methods for treating wastewater and/or effluent such as water that has been used in conjunction with subterranean operations. More particularly, the present disclosure relates to wastewater or effluent treatment systems that employ filtering skimmers and/or beaches for separating water from solids and/or other wastes in such wastewater or effluent.

The wastewater or effluent treated using the methods and/or systems of the present disclosure may be any aqueous fluid from any source, including but not limited to water or another aqueous fluid recovered from a subterranean formation at a job site. That wastewater or effluent may include water or other aqueous fluids that had been used as treatment fluids in the formation, naturally occurring water or other aqueous fluids residing in the formation, or a combination thereof. In those embodiments, the wastewater or effluent may be recovered from the subterranean formation in conjunction with any type of subterranean operation or treatment, including but not limited to hydraulic fracturing treatments, acidizing treatments, and drilling operations. In certain embodiments, a drilling fluid may be introduced into a subterranean formation while drilling at least a portion of a well bore that penetrates a subterranean formation, and the drilling fluid may serve a number of purposes, including but not limited to suspending and circulating drill cuttings out of the well bore, cooling and/or lubricating a drill bit, and the like. Wastewater or effluent also may be produced by other processes and/or equipment at a job site, including but not limited to rainwater and deck drainage, as well as water used as a coolant, cleaning fluid, and/or other surface operations. Once the wastewater or effluent is treated, the treated water may be re-used in one or more of the operations listed above. For example, in some embodiments, the treated water may be pumped into a mud pit where drilling fluids are prepared and/or held prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater or effluent was recovered).

The systems of the present disclosure generally include at least one tank defined by a bottom wall and at least one side wall; a beach including a ramped (e.g., inclined) surface disposed near a side wall of the tank, the ramped surface having a base end at a first elevation relative to the bottom wall of the tank and a top end opposite the base end at a second elevation relative to the bottom wall of the tank, the second elevation being greater than the first elevation; and a skimmer disposed in or near at least a portion of the tank that is configured to move water and/or other materials at the surface of a liquid in the tank toward the beach. For example, in some embodiments the skimmer may be configured to travel along a surface of a liquid contained within the tank to push water and/or other materials at the surface toward the beach. In the systems of the present disclosure, at least a portion of the skimmer and/or the ramped surface of the beach includes a porous filter material that is selected to allow water to pass therethrough while collecting solids and/or other non-aqueous contaminants suspended near the surface of wastewater or effluent. In some embodiments, the treatment systems optionally may further include additional tanks, vessels, conduits, or other devices for removing contaminants from water, including but not limited to chemical treatment tanks, reverse osmosis treatment units, electrocoagulation units, additional filters, and the like.

In some embodiments, the treatment systems of the present disclosure may be located, and the treatment methods may performed, on an offshore rig or ship that is engaged in offshore subterranean operations, such as a drilling rig or drill ship. In other embodiments, the treatment system may be located, and the treatment methods may performed, at a land-based job site. The various components of the wastewater or effluent treatment system discussed herein, as well as any other components of that system, may be housed together in a single unit, or may be provided as one or more separate modules or tanks that may be connected and/or otherwise used together to perform different portions of the treatment process.

The tank generally includes a bottom surface and at least one side wall, but otherwise may be of any suitable shape and size for holding and/or treating wastewater or effluent from the applicable treatment operations. The tank may include one or more inlets through which wastewater or effluent may flow into the tank, and one or more outlets through which water may be released after at least a portion of the waste materials such as oils, emulsions, and/or particulate material in the wastewater or effluent have been removed. Any suitable valves, pumps, or other devices may be used for controlling the flow of water through the inlets and/or outlets of the tank. In some embodiments, the tank may be equipped with one or more agitation devices such as rotary stirring rods, paddles, blades, air nozzles, etc. that are configured to stir, mix, and/or agitate the contents of the tank and, in some instances, promote the separation of water and contaminants in the tank.

The skimmer generally includes any device configured to move water and/or other materials at the surface of a liquid in the tank toward the beach. For example, in some embodiments the skimmer may be configured to travel generally parallel to the surface of the wastewater or effluent in the tank and move materials on the surface thereof, including but not limited to skimmer arms, rakes, paddles, rotating belts, etc. In other embodiments, the skimmer may include a vacuum device that is configured to pull at least a partial vacuum across the surface of the liquid in the tank to pull water and/or other materials at the surface toward the beach. In other embodiments, the skimmer may include an air blowing device such as a fan or air knife that is configured to push air across the surface of the liquid in the tank to push water and/or other materials at the surface toward the beach. In some embodiments, the motion or other action of the skimmer is motorized and may be controlled using suitable mechanical and/or computerized equipment known in the art. The skimmer may be of any width suitable for moving materials on the surface of the wastewater or effluent, and in some embodiments, may extend the entire width of the tank or any portion thereof in one direction. In some embodiments, the elevation of the skimmer and/or its supporting structure relative to the level of the wastewater or effluent in the tank may be adjusted, e.g., according to the level of the wastewater or effluent in the tank so that at least a portion of the skimmer is located near or at the surface of the wastewater or effluent. In some embodiments, at least a portion of the skimmer may be configured to deform (e.g., bend), shift, rotate, or retract upward when it comes into contact with the beach so that the skimmer may move along substantially the entire length of the tank and over the beach.

The beach generally includes a top ramped surface, which may be either a planar surface or a concave curved surface. The ramped surface may be inclined and/or curved at any suitable angle that is less than a right angle, and may extend along the entire width of the tank or any portion thereof in one direction. The top surface of the beach includes a base end at a lower elevation relative to the bottom surface of the tank and a top end opposite the base end at a higher elevation relative to the bottom surface of the tank. In some embodiments, the beach may be mounted and/or otherwise disposed near (e.g., adjacent to) a side wall of the tank such that the base end of the beach is nearest (e.g., adjacent to) the side wall of the tank at or near the top of the tank, and the top end of the beach extends in a direction away from the tank. In some embodiments, the beach may be mounted and/or otherwise disposed in the tank (e.g., within the side walls of the tank) such that the elevation of the base end is located just below the surface of the wastewater or effluent and the elevation of the top end of the beach is located above the surface of the wastewater or effluent. As the skimmer moves across the tank and toward the beach, it may move waste materials such as oils, emulsions, and/or particulate material at or near the surface of the wastewater or effluent onto at least the base end of the beach. The ramped surface of the beach may be stationary, or it may be adjustable or dynamic (e.g., moveable) in various ways. For example, in some embodiments, the ramped surface of the beach may include a traveling/rotating belt or revolving filter conveyor that may assist in separating water from contaminants and moving separated contaminants out of or away from the tank. In some embodiments, the elevation of the beach may be adjustable based on, among other things, the surface level of the wastewater or effluent in the tank.

The filter material used in the beach and/or skimmer may include any rigid or semi-rigid porous material (e.g., plastic, metal, fabric, etc.) having a pore size sufficient to allow water to pass through it while filtering solids and/or other materials out of the water. In some embodiments, the filter material may have a pore size of less than about 1 μm. In other embodiments, the filter material may have a pore size of about 200 μm or less, about 150 μm or less, about 100 μm or less, about 20 μm or less, or about 5 μm or less. In some embodiments, the filter material in the beach and/or skimmer may include a microfilter membrane (e.g., having a pore size of about 0.1 μm to 10 μm, or alternatively about 0.5 μm to 5 μm, or alternatively about 1 μm to 2 μm), a nanofilter membrane (e.g., having pore size of about 1 nm to 10 nm, or alternatively about 2 nm to 8 nm, or alternatively about 4 nm to 6 nm), an ultrafilter membrane, a reverse osmosis membrane, a screen or mesh, a grating, or any combination thereof. In some embodiments, the filter material may be made of or coated with a hydrophobic or oleophobic material such as a polymer spray, etc., among other reasons, to facilitate the separation of water from the other materials caught by the filter. Examples of such coating materials may include, but are not limited to manganese oxide polystyrene, zinc oxide polystyrene, precipitated calcium carbonate, carbon nanotubes, silica nano-coatings, silicone or silane variants, and the like. In some embodiments, the filter material may be rendered hydrophobic or or oleophobic based on its surface topography, which may be etched and/or modified using techniques such as chemical etching, laser scribing, laser engraving, etc. The type of material and/or pore size of the filter material may be selected based on a number of factors, including but not limited to the composition, particle size, or droplet size of the contaminants to be removed from the wastewater or effluent. In some embodiments, a vacuum unit may be installed on the underside of a beach including a filter material that may pull air through the filter material of the beach, among other reasons, to increase the flow of water through the filter that is not collected for disposal, thereby increasing the efficiency of the treatment process.

In the methods of the present disclosure, wastewater or effluent that contains some amount of waste materials such as oils, emulsions, and/or particulate material is placed in a tank in which the skimmer and beach are installed. The wastewater or effluent may be treated (e.g., with chemical additives such as flocculants) in the tank or before the wastewater or effluent is placed in the tank to encourage the waste materials therein to float at or near the surface of the wastewater or effluent in the tank. As the skimmer moves along the wastewater or effluent surface in the tank, the skimmer passes through the wastewater or effluent at or near the surface of the wastewater or effluent and moves (e.g., pushes) at least a portion of the wastewater or effluent that includes the waste material up the ramped surface of the beach. In doing so, at least a portion of the wastewater or effluent may pass through the filter material of the skimmer and/or beach and return to the tank, while waste materials such as oils, emulsions, and/or particulate material are retained on the skimmer and/or beach. The waste materials separated from the wastewater or effluent in this way then may be placed in a disposal container for disposal or transport while the remaining treated water may be further treated, discharged, and/or reused in subsequent operations (e.g., further subterranean operations at the same job site from which the wastewater or effluent was recovered). For example, in some embodiments, the treated water may be pumped into a mud pit where drilling fluids are prepared and/or held prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater or effluent was recovered). In certain embodiments, the treated water may be transferred from the tank described above to another treatment vessel such as a reverse osmosis unit, among other reasons, to remove salts and/or other species dissolved in the water, after which the remaining fresh water may be discharged, and/or reused in subsequent operations.

Among the many potential advantages to the methods and compositions of the present disclosure, only some of which are alluded to herein, the methods, compositions, and systems of the present disclosure may increase the amount of treated water that is recycled from wastewater or effluent at a job site. In some embodiments, this may reduce the amount of water that is inadvertently mixed with waste materials and collected for disposal, thereby increasing the efficiency of disposing those waste materials. In some embodiments, the methods and systems of the present disclosure also may increase the amount of fresh water available for reuse in subsequent subterranean operations. In some embodiments, the methods and systems of the present disclosure also may decrease the amount of time needed to separate waste materials from wastewater or effluent collected at a job site. In some embodiments, the methods and systems may reduce the amounts and/or concentrations of contaminants in wastewater or effluent sufficiently to re-use that treated wastewater in subsequent operations (e.g., as a fracturing fluid, completion brine, etc.) at the same well site or job site where it was recovered. This may, among other benefits, reduce or eliminate the cost associated with transporting fresh water to the well site or job site for such operations.

Figure 1:
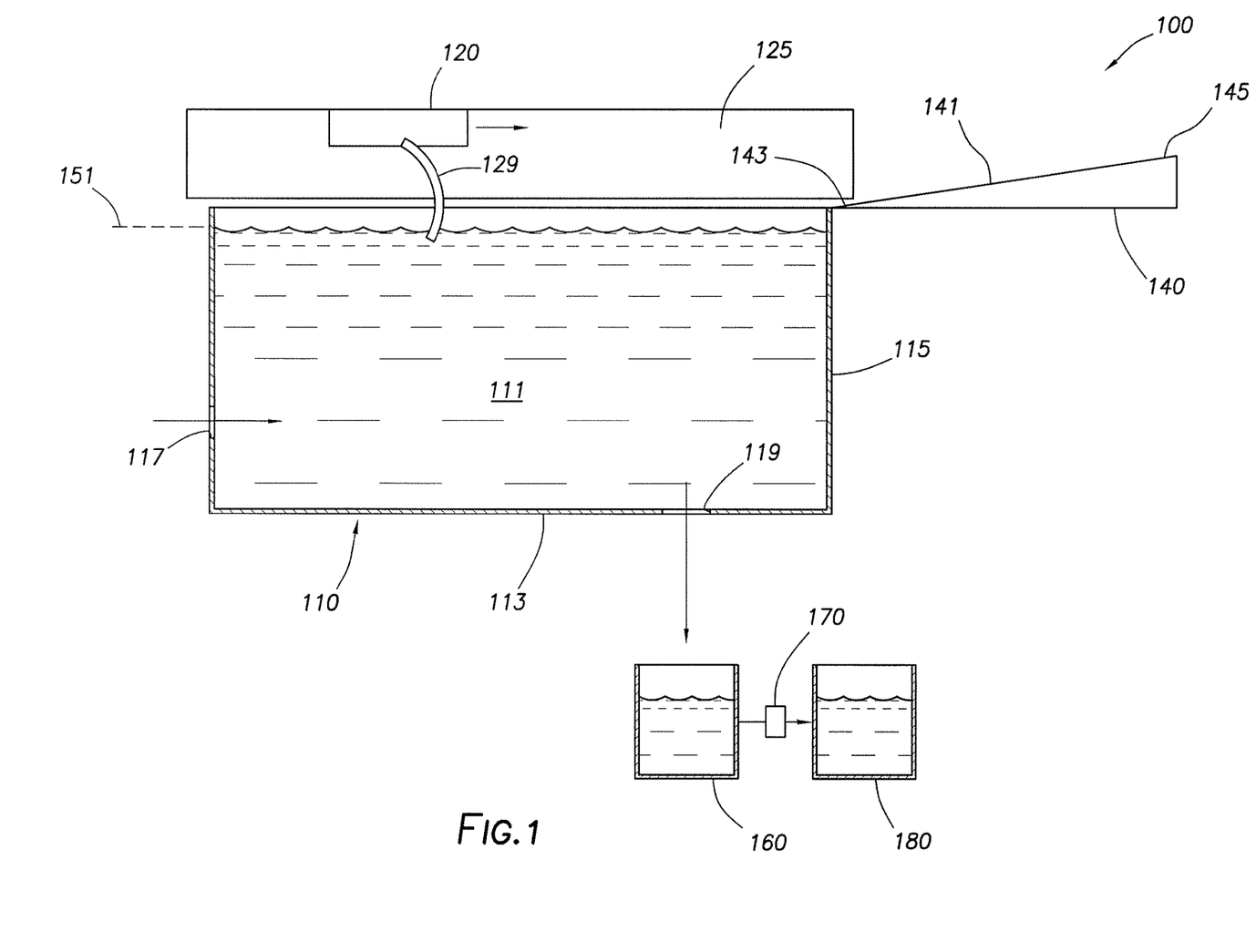
FIG. 1 is a diagram illustrating a side view of a treatment system according to certain embodiments of the present disclosure.

A portion of a wastewater or effluent treatment system 100 according to certain aspects of the present disclosure is shown in FIG. 1. The treatment system 100 is typically located at a well site, but alternatively may be deployed at other locations where wastewater or effluent carrying waste materials such as oils, emulsions, and/or particulate material is treated. In some embodiments, the treatment system 100 may be located on an offshore rig or ship that is engaged in offshore subterranean operations, such as a drilling rig or drill ship. In other embodiments, the treatment system 100 may be located at a land-based job site. The components of the wastewater or effluent treatment system of the present disclosure shown in FIG. 1, as well as any other components of that system, may be housed together in a single unit, or may be provided as one or more separate modules or tanks that may be connected and/or otherwise used together to perform different portions of the treatment process.

Referring now to FIG. 1, treatment system 100 generally includes a tank 110 in which wastewater or effluent 111 may be deposited after use in a subterranean operation such as a drilling operation. The tank 110 generally includes a bottom surface 113 and at least one side wall 115, but otherwise may be of any suitable shape and size for holding and/or treating wastewater or effluent from the applicable treatment operations. As shown, tank 110 includes an inlet 117 in the side wall 115 of the tank 110 through which wastewater or effluent may flow into the tank 110, and an outlet 119 in the bottom surface 113 of the tank through which water may be released after waste materials such as oils, emulsions, and/or particulate material have been removed. Any suitable valves, pumps, or other devices may be used for controlling the flow of water through inlet 117 and outlet 119. In some embodiments, the tank 110 may be located in or associated with a treatment system that includes other tanks, vessels, and/or conduits (not shown) upstream or downstream of tank 110 where the wastewater or effluent may be subjected to other treatments such as chemical treatments. In some embodiments, tank 110 may include a dissolved air flotation unit, prior to which chemicals that bind and/or flocculate particulates in the wastewater or effluent may be added, making them easier to mechanically separate from the wastewater or effluent. After the wastewater or effluent has been chemically treated, it may flow into the tank 110 through the inlet 117. In some embodiments, these and/or other chemical additives may be added to the wastewater or effluent in tank 110 itself and allowed to interact with species in the wastewater or effluent while in the tank 110.

Treatment system 110 further includes a skimmer device 120 at or just above the surface 151 of the wastewater or effluent 111 in the tank 110, and a beach 140 including a ramped surface installed adjacent to the side wall 115 of the tank 110. The skimmer device may include any device configured to travel generally parallel to the surface 151 of the wastewater or effluent 111 and remove materials from the surface thereof, including but not limited to skimmer arms, rakes, paddles, rotating belts, etc. In the embodiment shown, the skimmer device 120 is supported by a track 125 along which the skimmer device 120 moves parallel to the surface 151 of the wastewater or effluent 111 toward a beach 140 disposed in the tank 110. In some embodiments, the elevation of the skimmer device 120 and/or its supporting structure relative to the bottom surface 113 of the tank 110 may be adjusted according to a surface level 151 of the wastewater or effluent 111 in the tank 110 so that at least a portion of the skimmer device (e.g., extension portion 129) is located near or at the surface level 151 of the wastewater or effluent 111. In the embodiment shown, the skimmer device 120 includes an extension portion 129 such as a flap or fin that extends downwardly toward the tank 110, and is positioned in or above the tank 110 such that the extension portion 129 extends into the wastewater or effluent 111 in the tank 110. In other embodiments, the skimmer device 120 may include a conveyer belt-type structure having multiple extension portions disposed thereon, and the extension portions may travel generally parallel to the surface 151 of the wastewater or effluent 111 as the conveyer belt is rotated along the surface 151 of the wastewater or effluent 111. In the embodiment shown, the extension portion 129 of skimmer device 120 may pass through the wastewater or effluent 111 at or near the surface level 151 when the skimmer device 120 moves laterally toward the beach 140. The skimmer device 120 and/or the extension portion 129 may be configured to deform (e.g., bend), shift, rotate, or retract upward when it comes into contact with the beach 140 so that the skimmer device may move along substantially the entire length of the tank 110 and over the beach 140.

As noted above, the treatment system 100 further includes a beach 140 that generally includes a top ramped surface 141, which may be either a planar surface or a concave curved surface. The top surface 141 of the beach includes a base end 143 at a lower elevation relative to the bottom surface 113 of the tank 110 and a top end 145 opposite the base end 143 at a higher elevation relative to the bottom surface 113 of the tank 110. In the embodiment shown, the beach 140 is disposed adjacent to a side wall 115 of the tank 110 such that the base end is located adjacent to the top of the side wall 115 of the tank 110.

Figure 2:
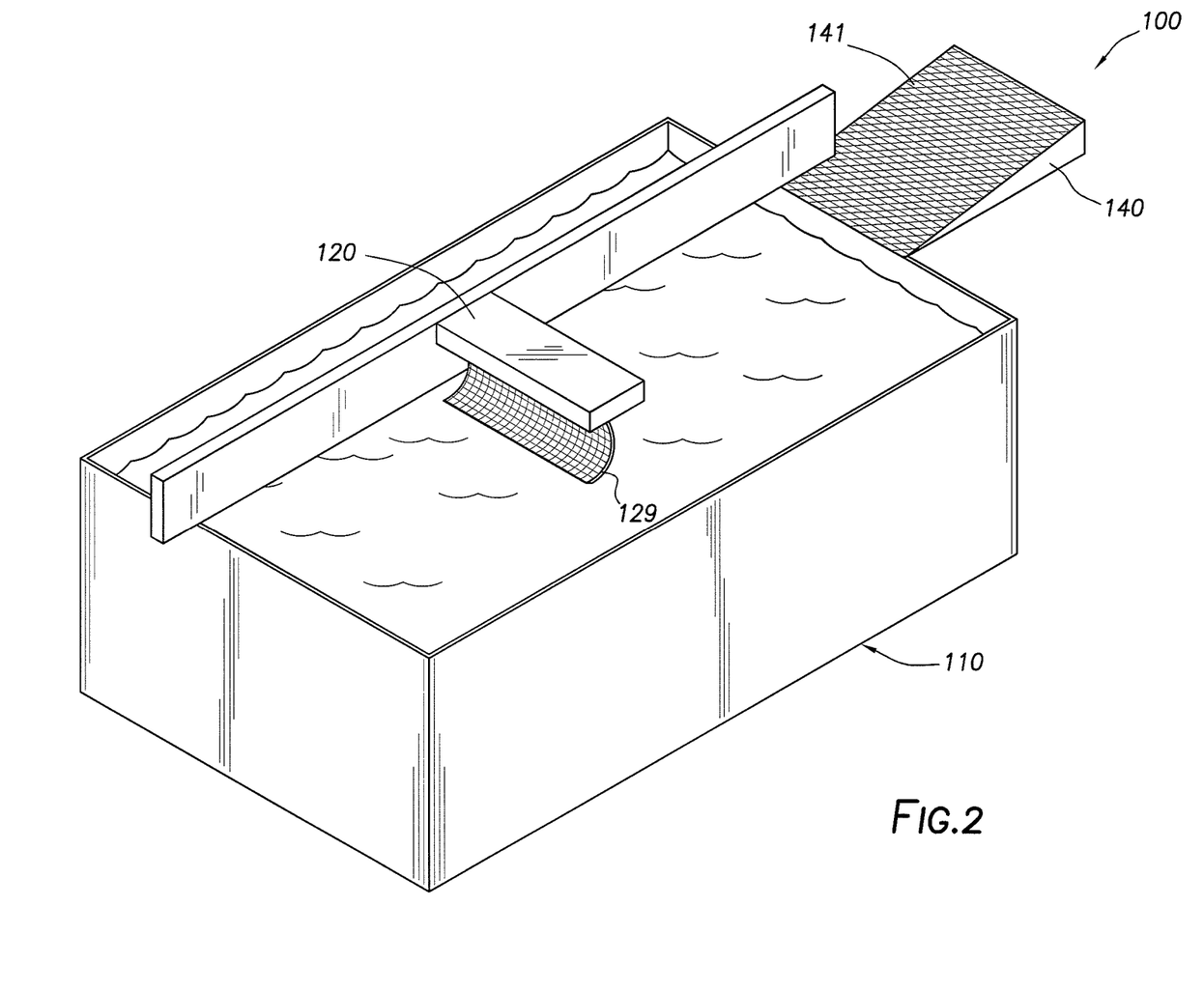
FIG. 2 is a diagram illustrating a perspective view of a treatment system according to certain embodiments of the present disclosure.

As noted above, at least a portion of the top surface 141 of the beach 140 and/or at least a portion of the skimmer device 120 is made of a porous filter material. Referring now to FIG. 2, a perspective view of a portion of the system from FIG. 1 is shown, which shows that the top surface 141 of the beach 140 and the extension portion 129 of the skimmer device 120 are made of a porous filter material. In the embodiment shown, the entirety of the top surface 141 of the beach 140 and the entirety of the extension portion 129 are made of a filter material. In other embodiments, only one of the top surface 141 of the beach 140 or the extension portion 129 may be made of a filter material. In still other embodiments, only a portion of the top surface 141 of the beach 140 (e.g., only a portion of the top surface 141 near the base end 143) and/or only a portion of the extension portion 129 (e.g., only a lower portion of the extension portion 129) may be made of a filter material. In still other embodiments, all or part of the top surface 141 of the beach 140 and/or all or part of the skimmer device 120 each may include several different types of filter materials, which may have the same or substantially equivalent pore sizes or different pore sizes. For example, in certain embodiments where the skimmer device 120 includes multiple extension portions extending into the tank, the extension portions may include several different types of filter materials, which may have the same or substantially equivalent pore sizes or different pore sizes (e.g., the filter materials of multiple extension portions sequentially passing through the tank may have successively decreasing pore sizes). In embodiments such as that shown in FIG. 2 wherein both a portion of the top surface of the beach and a portion of the skimmer device include a filter material, they may include the same filter material or different filter materials, and may include different filter materials of the same or substantially equivalent pore sizes or different pore sizes. In some of these embodiments, the filter material of the skimmer device may have a larger pore size than the filter material of the top surface of the beach.

Referring back to FIG. 1, tank 110 may include an outlet 119 in the bottom surface 113 of the tank through which water may be released after waste materials such as oils, emulsions, and/or particulate material have been separated from the wastewater or effluent. Outlet 119 may be coupled (e.g., via a conduit through which water may flow) to another vessel 160 in which the treated water may be held for further treatment. The terms "couple" or variations thereof, as used herein, are intended to mean either an indirect or a direct connection. Thus, if a first device is coupled to a second device, that connection may be through a direct connection or through an indirect via other devices, conduits, and/or connections. For example, the treatment system 100 may further include a secondary treatment unit 170 such as a reverse osmosis treatment unit, electrocoagulation unit, or a specialized filter that may be used, for example, to remove salts or other species dissolved in the water. In other embodiments, the tank 110 may be coupled to a secondary treatment unit 170 directly. The treatment system 100 may further include another vessel 180 coupled to the secondary treatment unit 170 for holding treated water for disposal, discharge, or further use. The system also optionally may include one or more pumps or other devices (not shown) for moving water from the tank 110 into vessel 160, secondary treatment unit 170, and/or vessel 180.

In operating the system shown in FIGS. 1 and 2, wastewater or effluent 111 that contains some amount of waste materials such as oils, emulsions, and/or particulate material may flow into tank 110 via inlet 117. In some embodiments, the wastewater or effluent may be treated (e.g., with chemical additives such as flocculants) in tank 110 or before the wastewater or effluent is placed in the tank to encourage the waste materials to float at or near the surface 151 of the wastewater or effluent 111 in the tank 110. As the skimmer device 120 moves along the track 125, at least the extension portion 129 of the skimmer device 120 passes through the wastewater or effluent at or near the surface 151 of the wastewater or effluent 111 and pushes at least a portion of the wastewater or effluent that includes the waste materials such as oils, emulsions, and/or particulate material up the ramped surface 141 of the beach 140. In doing so, at least a portion of the wastewater or effluent may pass through the filter material of the extension portion 129 of the skimmer device 120 and/or the ramped surface 141 of the beach 140 and return to the tank 110 below, while the waste materials are retained in or on the skimmer device 120 and/or beach 140. The waste materials separated from the wastewater or effluent in this way then may be removed from the skimmer device 120 and/or beach 140 and placed in a disposal container (not shown) for disposal or transport. The treated water may be pumped out of tank 110 through outlet 119, flow into vessel 160, and subsequently may be treated or filtered in treatment unit 170, for example, to remove salts or other species dissolved in the water. Thereafter, in some embodiments, the fresh water in vessel 180 may be discharged or used in subsequent operations. For example, the fresh water from vessel 180 may be pumped into a mud pit (not shown) where drilling fluids are prepared and/or stored prior to use. The treated water may be mixed with one or more additional components in the mud pit and then pumped out into a drillstring or coiled tubing (not shown) that is used to drill at least a portion of a well bore penetrating a subterranean formation (e.g., the same subterranean formation from which the wastewater or effluent was recovered).

As a person of skill in the art will recognize with the benefit of this disclosure, the skimmer and beach (as well as other components of the water treatment system) may be arranged in configurations other than those shown in FIGS. 1 and 2. For example, the tank may include a generally round or circular tank and the skimmer may travel along the surface of the water in the tank in a circular direction (e.g., in a clockwise or counter-clockwise direction, with an arm having one end retained in a central portion of the tank and another end that extends radially toward the outer wall of the tank that moves along the circumference of the tank). In these embodiments, the beach may be disposed in one region of the tank such that the skimmer is configured to move solids or other materials on the surface of the water in the tank toward the base end of the beach and up the ramped surface of the beach. Moreover, a person of skill in the art will recognize with the benefit of this disclosure that the systems may include a series of "staged" beaches and/or skimmers that include filter materials of progressively decreasing pore sizes, among other reasons, to filter out larger particles in a first "stage" and then smaller particles in a subsequent "stage" using a filter material of a smaller pore size. Such a series of "staged" beaches and/or skimmers may be used in the same tank, or may be distributed across a series of several different tanks through which the wastewater or effluent is passed in the treatment process.

An embodiment of the present disclosure is a system including: at least one tank defined by a bottom wall and at least one side wall; a beach including a ramped surface disposed near a side wall of the tank, the ramped surface having a base end disposed at a first elevation relative to the bottom wall of the tank, and a top end opposite the base end at a second elevation relative to the bottom wall of the tank, the second elevation being greater than the first elevation; and a skimmer disposed in at least a portion of the tank that is configured to move water or other material at a surface of a liquid contained within the tank toward the beach, wherein (a) at least a portion of the skimmer, (b) at least a portion of the ramped surface of the beach, or (c) at least portions of both the skimmer and the ramped surface of the beach includes a filter material.

In one or more embodiments described in the preceding paragraph, the skimmer is configured to travel along the surface of the liquid contained within the tank. In one or more embodiments described above, the skimmer includes a vacuum device configured to pull at least a partial vacuum across the surface of the liquid contained within the tank. In one or more embodiments described above, the skimmer includes an air blowing device configured to blow air across the surface of the liquid contained within the tank. In one or more embodiments described above, a portion of the skimmer includes a first filter material and the ramped surface of the beach includes a second filter material. In one or more embodiments described above, wherein the first filter material has a pore size that is greater than a pore size of the second filter material. In one or more embodiments described above, the wastewater or effluent includes water recovered from at least a portion of a subterranean formation during an operation in the subterranean formation. In one or more embodiments described above, the wastewater or effluent includes a washdown fluid collected at a job site. In one or more embodiments described above, the tank further includes an outlet that is coupled to a mud pit configured to prepare or hold a drilling fluid. In one or more embodiments described above, the system is located on an offshore rig or ship. In one or more embodiments described above, the system is located at a land-based job site.

Another embodiment of the present disclosure is a method including: providing a tank in which wastewater or effluent is contained, the wastewater or effluent including water and a waste material located at or near a surface of the wastewater; and using a skimmer to move at least a portion of the waste material at or near the surface of the wastewater or effluent in the tank toward a beach, the beach including a ramped surface disposed near a side wall of the tank, the ramped surface having a base end disposed at a first elevation relative to the bottom wall of the tank and a top end opposite the base end disposed at a second elevation relative to the bottom wall of the tank, the second elevation being greater than the first elevation, wherein (a) at least a portion of the skimmer, (b) at least a portion of the ramped surface of the beach, or (c) at least portions of both the skimmer and the ramped surface of the beach includes a filter material.

In one or more embodiments described in the preceding paragraph, using the skimmer to move at least the portion of the waste material at or near the surface of the wastewater or effluent in the tank includes moving the skimmer along the surface of the liquid contained within the tank. In one or more embodiments described above, the method further includes allowing at least a portion of the wastewater to pass through the filter material of the beach and/or the skimmer. In one or more embodiments described above, the wastewater includes water recovered from at least a portion of a subterranean formation during an operation in the subterranean formation. In one or more embodiments described above, the wastewater or effluent includes a washdown fluid collected at a job site. In one or more embodiments described above, the method further includes, after the step of using the skimmer to move at least a portion of the first amount of the oil, emulsion, or particulate material onto the ramped surface of the beach: forming a treatment fluid that includes at least a portion of water retained in the tank; and introducing the treatment fluid into at least a portion of a subterranean formation. In one or more embodiments described above, the skimmer is configured to travel along the surface of the liquid contained within the tank. In one or more embodiments described above, the skimmer includes a vacuum device configured to pull at least a partial vacuum across the surface of the liquid contained within the tank. In one or more embodiments described above, the skimmer includes an air blowing device configured to blow air across the surface of the liquid contained within the tank. In one or more embodiments described above, the tank is located on an offshore rig or ship.

Another embodiment of the present disclosure is a method including: providing a tank in which wastewater or effluent is contained, wherein the wastewater or effluent including water and a waste material located at or near a surface of the wastewater, and the wastewater was collected from at least a portion of a subterranean formation during an operation in the subterranean formation; using a skimmer to separate at least a portion of the waste material at or near the surface of the wastewater or effluent and move the portion of the waste material onto a beach, wherein the beach includes a ramped surface disposed near a side wall of the tank, the ramped surface having a base end disposed at a first elevation relative to the bottom wall of the tank and a top end opposite the base end disposed at a second elevation relative to the bottom wall of the tank, the second elevation being greater than the first elevation, and at least a portion of the skimmer and at least a portion of the ramped surface of the beach includes a filter material; forming a treatment fluid that includes at least a portion of water retained in the tank; and introducing the treatment fluid into at least a portion of the subterranean formation.

In one or more embodiments described in the preceding paragraph, the treatment fluid includes a drilling fluid and the method further includes introducing the drilling fluid into at least a portion of a well bore that penetrates a subterranean formation while drilling the well bore. In one or more embodiments described above, the wastewater or effluent includes a washdown fluid collected at a job site. In one or more embodiments described above, the tank further includes an outlet that is coupled to a mud pit configured to prepare or hold a drilling fluid. In one or more embodiments described above, the skimmer is configured to travel along the surface of the liquid contained within the tank. In one or more embodiments described above, the skimmer includes a vacuum device configured to pull at least a partial vacuum across the surface of the liquid contained within the tank. In one or more embodiments described above, the skimmer includes an air blowing device configured to blow air across the surface of the liquid contained within the tank. In one or more embodiments described above, the tank is located on an offshore rig or ship. In one or more embodiments described above, the tank is located at a land-based job site.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A system comprising:
   at least one tank defined by a bottom wall and at least one side wall;
   a beach comprising a ramped surface disposed near a side wall of the tank, the ramped surface having
      a base end disposed at a first elevation relative to the bottom wall of the tank, and
      a top end opposite the base end at a second elevation relative to the bottom wall of the tank, the second elevation being greater than the first elevation; and
   a skimmer disposed in at least a portion of the tank that is configured to move water or other material at a surface of a liquid contained within the tank toward the beach,
   wherein (a) at least a portion of the skimmer, (b) at least a portion of the ramped surface of the beach, or (c) at least portions of both the skimmer and the ramped surface of the beach comprises a filter material.

2. The system of claim 1 wherein the skimmer is configured to travel along the surface of the liquid contained within the tank.

3. The system of claim 1 wherein a portion of the skimmer comprises a first filter material and the ramped surface of the beach comprises a second filter material.

4. The system of claim 3 wherein the first filter material has a pore size that is greater than a pore size of the second filter material.

5. The system of claim 1 wherein the liquid comprises water recovered from at least a portion of a subterranean formation during an operation in the subterranean formation.

6. The system of claim 1 wherein the liquid comprises a washdown fluid collected at a job site.

7. The system of claim 1 wherein the tank further comprises an outlet that is coupled to a mud pit configured to prepare or hold a drilling fluid.

8. The system of claim 1 wherein the system is located on an offshore rig or ship.

9. The system of claim 1 wherein the system is located at a land-based job site.

10. A method comprising:
    providing a tank in which wastewater or effluent is contained, the wastewater or effluent comprising water and a waste material located at or near a surface of the wastewater; and
    using a skimmer to move at least a portion of the waste material at or near the surface of the wastewater or effluent in the tank toward a beach, the beach comprising a ramped surface disposed near a side wall of the tank, the ramped surface having a base end disposed at a first elevation relative to the bottom wall of the tank and a top end opposite the base end disposed at a second elevation relative to the bottom wall of the tank, the second elevation being greater than the first elevation,
    wherein (a) at least a portion of the skimmer, (b) at least a portion of the ramped surface of the beach, or (c) at least portions of both the skimmer and the ramped surface of the beach comprises a filter material.

11. The method of claim 10 wherein using the skimmer to move at least the portion of the waste material at or near the surface of the wastewater or effluent in the tank comprises moving the skimmer along the surface of the liquid contained within the tank.

12. The method of claim 10 further comprising allowing at least a portion of the wastewater to pass through the filter material of the beach and/or the skimmer.

13. The method of claim 10 wherein the wastewater comprises water recovered from at least a portion of a subterranean formation during an operation in the subterranean formation.

14. The method of claim 10 wherein the wastewater or effluent comprises a washdown fluid collected at a job site.

15. The method of claim 10 further comprising, after the step of using the skimmer to move at least a portion of the first amount of the waste material onto the ramped surface of the beach:
   forming a treatment fluid that comprises at least a portion of water retained in the tank;
   and introducing the treatment fluid into at least a portion of a subterranean formation.

16. The method of claim 10 wherein the tank is located on an offshore rig or ship.

17. A method comprising:
   providing a tank in which wastewater or effluent is contained, wherein
      the wastewater or effluent comprising water and a waste material located at or near a surface of the wastewater, and
      the wastewater was collected from at least a portion of a subterranean formation during an operation in the subterranean formation;
   using a skimmer to separate at least a portion of the waste material at or near the surface of the wastewater or effluent and move the portion of the waste material onto a beach, wherein
      the beach comprises a ramped surface disposed near a side wall of the tank, the ramped surface having a base end disposed at a first elevation relative to the bottom wall of the tank and a top end opposite the base end disposed at a second elevation relative to the bottom wall of the tank, the second elevation being greater than the first elevation, and
   at least a portion of the skimmer and at least a portion of the ramped surface of the beach comprises a filter material;
      forming a treatment fluid that comprises at least a portion of water retained in the tank; and
      introducing the treatment fluid into at least a portion of the subterranean formation.

18. The method of claim 17 wherein the treatment fluid comprises a drilling fluid and the method further comprises introducing the drilling fluid into at least a portion of a well bore that penetrates a subterranean formation while drilling the well bore.

* * * * *